(12) United States Patent
Katsuki

(10) Patent No.: US 6,798,447 B1
(45) Date of Patent: Sep. 28, 2004

(54) IMAGE PROCESSING APPARATUS, IMAGE PROCESSING METHOD AND MEDIUM

(75) Inventor: Shinji Katsuki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/571,250

(22) Filed: May 16, 2000

(30) Foreign Application Priority Data

May 18, 1999 (JP) .......................................... 11-136697

(51) Int. Cl.[7] .............................................. H04N 5/228
(52) U.S. Cl. .............................. 348/208.12; 348/222.1; 348/352; 348/208.11; 386/112
(58) Field of Search ............................ 348/135, 208.4, 348/221.1, 390.1, 231.6, 362, 208.13, 208.16, 352, 363, 296, 416.1, 699, 208.12, 208.11; 375/240.16

(56) References Cited

U.S. PATENT DOCUMENTS

| | | | | | |
|---|---|---|---|---|---|
| 5,502,485 | A | * | 3/1996 | Suzuki ..................... | 348/231.6 |
| 6,018,362 | A | * | 1/2000 | Suzuki et al. ............ | 348/220.1 |
| 6,097,430 | A | * | 8/2000 | Komiya et al. .......... | 348/218.1 |
| 6,219,097 | B1 | * | 4/2001 | Kamishima et al. ........ | 348/297 |
| 6,404,776 | B1 | * | 6/2002 | Voois et al. ................. | 370/468 |
| 6,452,632 | B1 | * | 9/2002 | Umeda et al. .............. | 348/294 |
| 6,487,366 | B1 | * | 11/2002 | Morimoto et al. .......... | 386/117 |

* cited by examiner

*Primary Examiner*—Ngoc-Yen Vu
*Assistant Examiner*—Nelson D. Hernández
(74) *Attorney, Agent, or Firm*—Frommer Lawrence & Haug LLP; William S. Frommer; Bruno Polito

(57) ABSTRACT

The invention provides an image processing apparatus wherein, when an image of an imaging object is picked up and converted into image data and the image data is compressed, the data amount can be reduced without deteriorating the picture quality. The image processing apparatus includes an image pickup section for picking up an image of an imaging object and converting the image into image data, a compression section for compressing the image data and outputting the compressed data, a detection section for detecting a data amount of the compressed data, and a control section for controlling an optical condition for the image picked up by the image pickup section in response to the data amount of the compressed data detected by the detection section. The compression section compresses the image data obtained by the conversion of the image pickup section based on the optical condition controlled by the control section.

17 Claims, 7 Drawing Sheets

IMAGE PROCESSING APPARATUS, IMAGE PROCESSING METHOD AND MEDIUM

BACKGROUND OF THE INVENTION

This invention relates to an image processing apparatus and method and a medium, and more particularly to an image processing apparatus and method and a medium wherein an image of an imaging object is picked up and converted into image data and the image data is compressed.

A digital video camera is being popularized which compresses picked up moving pictures using a compression method such as the MPEG (Moving Picture Experts Group) compression method and records the compressed moving pictures onto a disk or a semiconductor memory.

In the MPEG method, data of a finite difference between fields or frames (in the following description, where there is no particular necessity for identification between a field and a frame, the term "field" is used commonly for them) which neighbor each other with respect to time is calculated to achieve temporal data compression. Further, pixel data are converted into DCT (Discrete Cosine Transform) coefficients to achieve spatial data compression.

A digital video camera of the type described above additionally has a hand-shaking correction function for correcting image data against hand-shaking, that is, an inadvertent movement of the digital video camera when an image is picked up by a user. Two different methods are conventionally available for hand-shaking correction. According to one of the methods, hand-shaking is detected by means of a sensor built in the digital video camera, and picked up image pixels obtained by a CCD (Charge Coupled Device) unit are parallelly translated relative to an image based on the detected hand-shaking. According to the other method, signals read out from such a CCD unit are delayed with respect to time.

In such compression of image data as described above, the relationship between the compression ratio and the picture quality depends upon two factors including the information amount (redundancy) of image data before compression and the amount of motion. In particular, in such compression that the picture quality deterioration between image data before compression and decoded data obtained by compression processing of the image data is lower than a predetermined level, for example, where small subjects exhibit quick and random motions, the compression ratio of image data is low.

For example, when an image of a person in front of a fountain is picked up, in order to suppress the picture quality deterioration of the entire image, MPEG compression allocates a comparatively great amount of coded data to random and quick motion of water of the fountain on the background, but uses a comparatively small amount of coded data for the representation of the person. Since a comparatively great amount of data is allocated to image data which is low in redundancy or exhibits quick motion, the picture quality of the person who is the main imaging object is deteriorated. Where image data is compressed such that the picture quality deterioration may be lower than a predetermined level as described above, the conventional digital video camera has a subject to be solved in that a high compression ratio cannot be applied to image data which is low in redundancy or exhibits quick motion.

Further, since hand-shaking correction is performed independently of compression processing of image data, the conventional digital video camera has another subject to be solved in that it has a great apparatus scale and requires a high cost as much.

SUMMARY OF THE INVENTION

It is an object of the present invention to provide an image processing apparatus and method and a medium wherein, when an image of an imaging object is picked up and converted into image data and the image data is compressed, the data amount can be reduced without deteriorating the picture quality.

In order to attain the object described above, according to an aspect of the present invention, there is provided an image processing apparatus which picks up and converts an image of an imaging object into image data and compresses the image data, comprising image pickup means for picking up an image of an imaging object and converting the image into image data, compression means for compressing the image data and outputting the compressed data, detection means for detecting a data amount of the compressed data, and control means for controlling an optical condition for the image picked up by the image pickup means in response to the data amount of the compressed data detected by the detection means, the compression means compressing the image data obtained by the conversion of the image pickup means based on the optical condition controlled by the control means.

With the image processing apparatus, since an optical condition upon imaging is controlled in response to a data amount, the data amount can be reduced without deteriorating the picture quality.

According to another aspect of the present invention, there is provided an image processing apparatus which picks up an image of an imaging object and converts the image into image data, comprising image pickup means for picking up an image of an imaging object and converting the image into image data, storage means for storing the image data, calculation means for calculating motion vectors of the image data stored in the storage means, compression means for compressing the image data stored in the storage means making use of the motion vectors and outputting the compressed data, detection means for detecting hand-shaking when a user picks up an image of the imaging object making use of the motion vectors, and correction means for correcting the image data against the hand-shaking in response to a result of the detection of the detection means.

With the image processing apparatus, since hand-shaking is detected using motion vectors which are calculated where compression of image data is involved, the necessity for a hand-shaking sensor is eliminated, and consequently, reduction in scale and cost of the apparatus can be realized.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

Figure 1A:
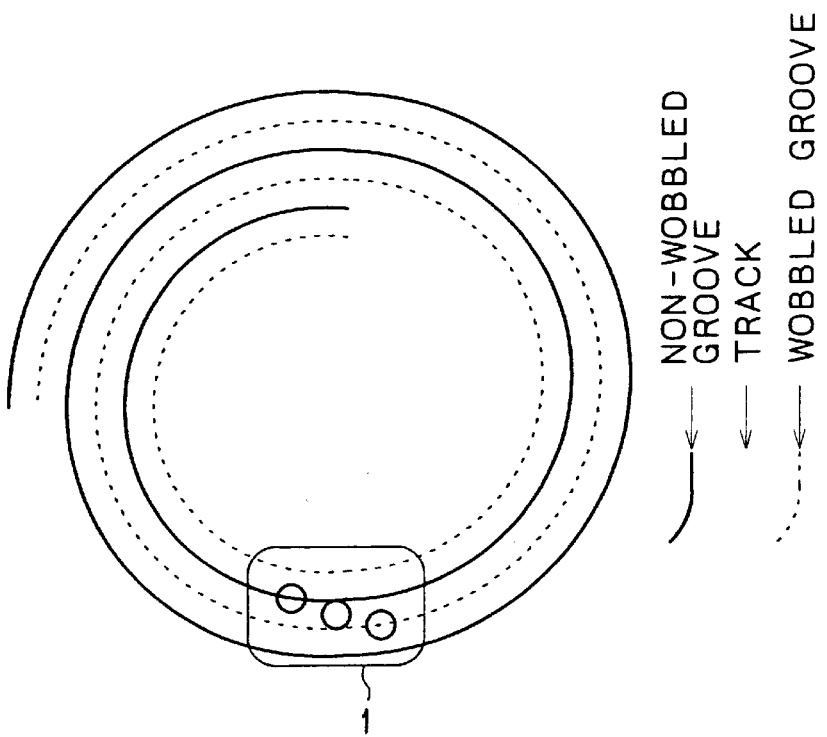
FIG. 1A is a diagrammatic view showing a groove and a track on a surface of a recording medium to which the present invention is applied.
Figure 1B:
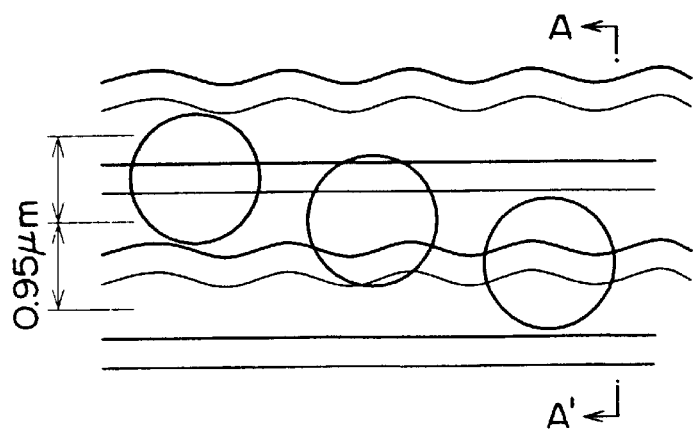
FIG. 1B is a diagrammatic view showing, in an enlarged scale, a groove and a track of the recording medium shown in FIG. 1A.

FIGS. 1A and 1B show a surface construction of tracks of a disk as a recording medium on which image information is recorded by means of a digital video camera to which the present invention is applied.

Referring to FIGS. 1A and 1B, the disk shown is a magneto-optical disk called MD (Mini Disc) (trademark). Two different types are available for the MD, and they are called MD-DATA1 and MD-DATA2 (hereinafter referred to briefly as MD1 and MD2, respectively) and identified as such. The MD2 is an improvement to the MD1. The MD shown in FIGS. 1A and 1B is an MD2, and in the following description, an embodiment of the present invention wherein an MD2 is used is described. However, the present invention can achieve similar effects also where an MD1 is used.

Figure 1C:
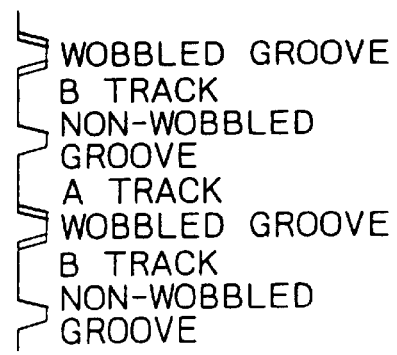
FIG. 1C is a sectional view showing the groove and the track of the recording medium shown in FIG. 1B.

As shown in FIG. 1A, a wobbled groove is formed spirally on the surface of the MD in accordance with a signal encoded by FM modulation and biphase modulation of physical addresses on the disk. Further, a non-wobbled groove which is not in a modulated state is formed spirally between adjacent circumferential portions of the spiral wobbled groove. The wobbled groove and the non-wobbled groove are formed as spiral grooves independent of each other. A pair of tracks are formed at lands between the wobbled groove and the non-wobbled groove. FIG. 1B shows, in an enlarged scale, a portion of the MD of FIG. 1A included in a rectangle 1, and FIG. 1C shows a cross section taken along line A—A' in FIG. 1B. It is to be noted that three small circles shown in FIGS. 1A and 1B represent spots of laser beams, and among them, the central one is for recording or reproduction while the opposite ones are for tracking.

Since circumferential portions of the wobbled groove and the non-wobbled groove are formed alternately as seen from FIG. 1B, track portions (lands) which are used as recording portions are divided into two types of tracks including a track which has the non-wobbled groove on the center side of the disk and has the wobbled groove on the outer side and another track which has the wobbled groove on the center side of the disk and has the non-wobbled groove on the outer side. Thus, as seen in FIG. 1C, the former track is called A track and the latter track is called B track for identification between them.

Since the wobbled groove is formed in accordance with a signal obtained by FM (Frequency Modulation) modulation and biphase modulation of a signal of a fixed frequency based on absolute addresses, any position on a track can be specified by reading an absolute address of the wobbled groove based on reflected light of a laser beam from the wobbled groove and identifying the track between the A track and the B track.

Further, the pitch of the tracks is 0.95 μm as seen in FIG. 1B, and the bit length is 0.39 μm/bit. The wavelength of a recording laser beam is 650 nm, and the lens aperture ratio is 0.52. For the modulation method, the RLL (Run Length Limited) (1, 7) is used, and for the error correction method, the RS-PC (Reed Solomon Product Code) method is used. Further, for the interleave method, a block concluded method is used. Thus, the redundancy is 19.7%, the data rate is 589 kB/s, and the recording capacity is 650 MB.

Figure 2:
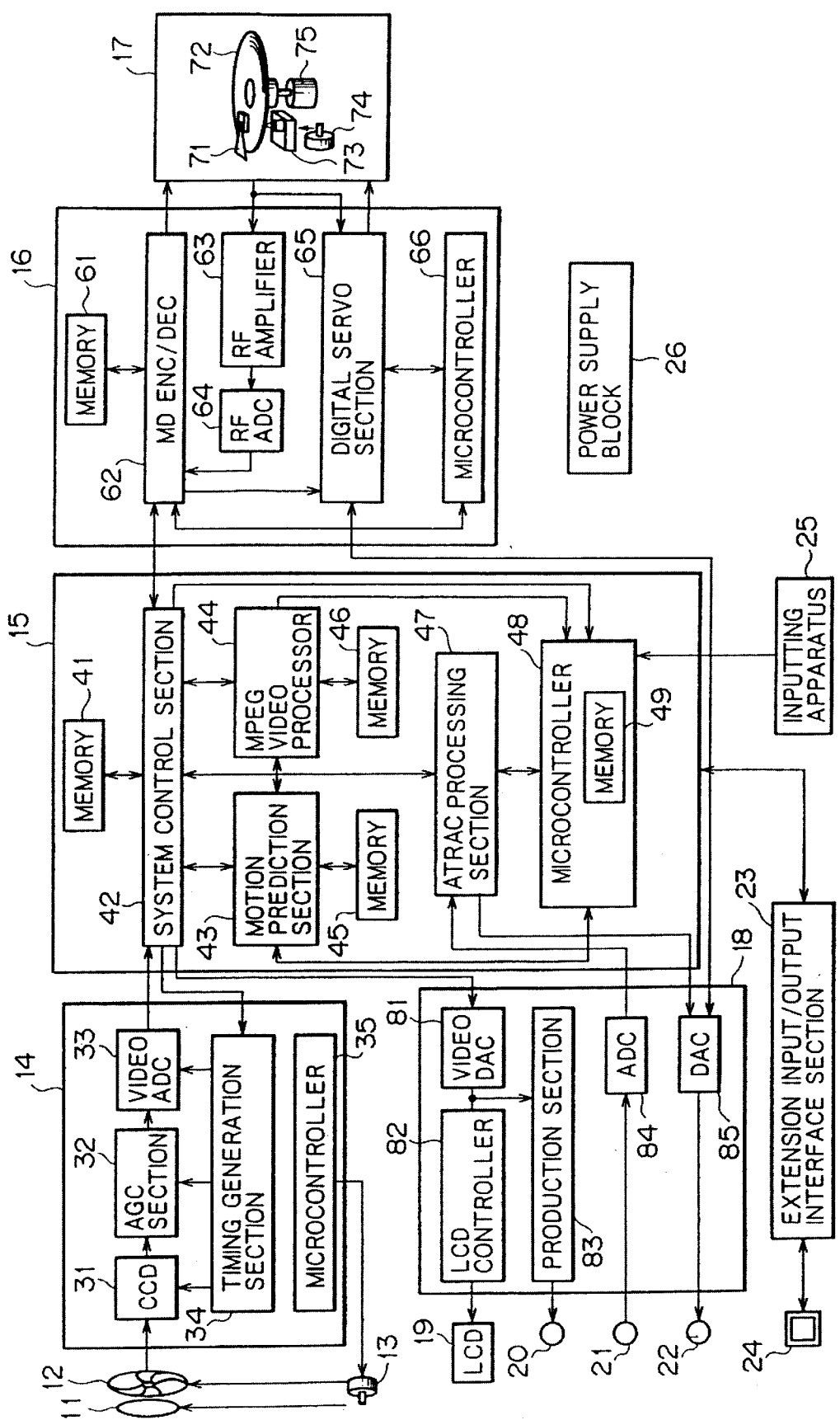
FIG. 2 is a block diagram showing an example of a construction of a digital video camera to which the present invention is applied.

FIG. 2 shows an example of a construction of a digital video camera to which the present invention is applied. Referring to FIG. 2, the digital video camera shown includes a camera block 14, a video signal processing section 15, a medium drive section 16, a mechanism deck section 17, an interface section 18, a liquid crystal display (LCD) unit 19, an extension input/output interface section 23, an inputting apparatus 25, and a power supply block 26.

The camera block 14 includes a charge coupled device (CCD) unit 31, an automatic gain control (AGC) section 32, and a video analog digital converter (ADC) 33. The camera block 14 operates under the control of a microcontroller 35 in response to a clock signal supplied thereto from a timing generation section 34. The microcontroller 35 controls a motor 13 to drive a lens 11 to execute focusing control and adjust a diaphragm 12 to control the light amount.

Light from an imaging object is introduced from the lens 11 through the diaphragm 12 to the CCD unit 31 of the camera block 14, by which it is converted from an optical signal into an electric signal. The gain of the electric signal is controlled by the AGC section 32. The signal having the controlled gain is inputted to the video ADC 33, by which it is converted from an analog signal into a digital signal. The digital signal is outputted as image data to the video signal processing section 15.

The video signal processing section 15 includes a memory 41, a system control section 42, a motion prediction section 43, an MPEG (Moving Picture Experts Group) video processor 44, a pair of memories 45 and 46, an ATRAC (Adaptive Transform Acoustic Coding) processing section 47, and a memory 49. Operation of the components of the video signal processing section 15 is controlled by a microcontroller 48.

Image data inputted from the camera block 14 is inputted to the system control section 42, by which it is stored once into the memory 41. The image data is thereafter supplied suitably to the motion prediction section 43 and the MPEG video processor 44. The motion prediction section 43 or the MPEG video processor 44 uses the memory 45 or 46 to perform motion prediction of an image or encoding or decoding processing of the MPEG method. The ATRAC processing section 47 performs, upon recording, compression processing of the audio data inputted thereto from the interface section 18 in accordance with a compression method for exclusive use for the MD called ATRAC and outputs resulting data to the medium drive section 16 through the system control section 42. On the other hand, upon reproduction, the ATRAC processing section 47 performs decompression processing and outputs resulting data to the interface section 18.

The memory 41 has stored therein in advance procedures for fade-out/fade-in, wipe and mix as effects to be added upon switching of a scene. The microcontroller 48 recognizes a script file stored in the memory 49 and instructs the system control section 42 to reproduce a scene and perform predetermined scene switching processing based on an order of scenes scribed in the script file. Corresponding to this, the system control section 42 recalls a procedure for effect processing stored in advance in the memory 41 and successively switches scenes to perform recording or reproduction.

Figure 3:
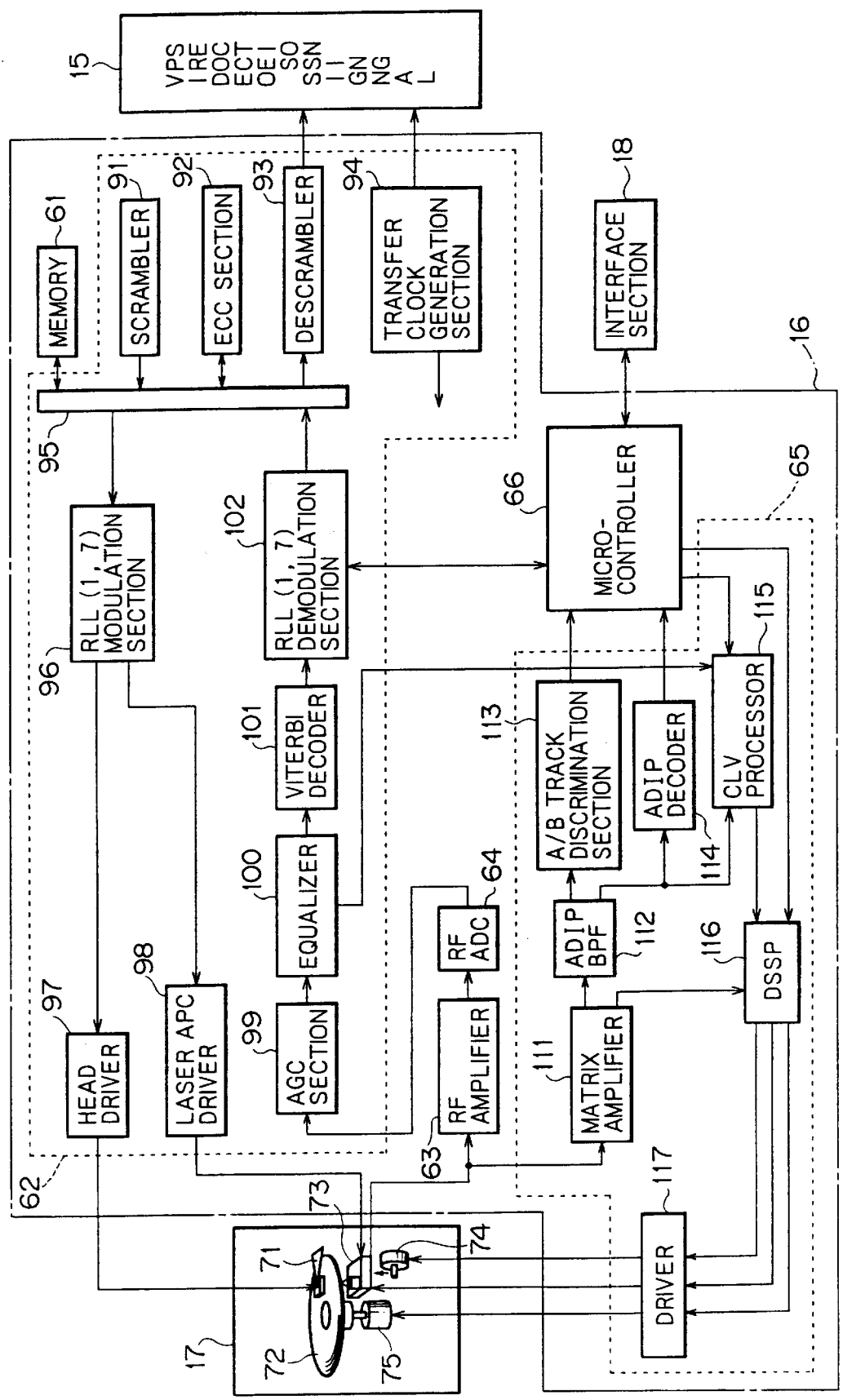
FIG. 3 is a block diagram showing an example of a construction of a medium drive and a mechanism deck section shown in FIG. 2.

It is to be noted that details of the medium drive section 16 and the mechanism deck section 17 are hereinafter described with reference to FIG. 3.

The interface section 18 includes a video digital analog converter (DAC) 81, an LCD controller 82, a production section 83, an ADC 84, and a DAC 85. The video DAC 81 converts image data inputted thereto from the system control section 42 of the video signal processing section 15 from a digital signal into an analog signal and outputs the analog signal to the LCD unit 19 through the LCD controller 82. The production section 83 produces a composite signal from a video signal inputted thereto and outputs the composite signal to a video output terminal 20. An audio signal inputted from a microphone input terminal 21 is converted from an analog signal into a digital signal by the ADC 84 and then outputted to the ATRAC processing section 47 of the video signal processing section 15. A signal inputted from the ATRAC processing section 47 or a digital servo section 65 to the DAC 85 is converted from a digital signal into an analog signal and then outputted to a line output terminal 22.

The extension input/output interface section 23 performs interface processing between an extension input/output terminal 24 and the video signal processing section 15.

The inputting apparatus 25 includes a plurality of buttons and so forth, and is operated by a user in order to input a starting or stopping instruction, a recording or reproduction instruction of the digital video camera or the like and outputs a signal corresponding to the operation to the microcontroller 48 of the video signal processing section 15.

The power supply block 26 supplies necessary power to the camera block 14, video signal processing section 15, medium drive section 16, mechanism deck section 17, interface section 18 and LCD unit 19.

The medium drive section 16 and the mechanism deck section 17 are described below with reference to FIG. 3. The medium drive section 16 includes a memory 61, an MD encoder/decoder (ENC/DEC) 62, a radio frequency (RF) amplifier 63, an RF ADC 64, and a digital servo section 65. The medium drive section 16 operates under the control of a microcontroller 66.

First, the MD ENC/DEC 62 of the medium drive section 16 is described. Image data outputted from the video signal processing section 15 is inputted to a scrambler 91 in synchronism with a clock signal generated by a transfer clock generation section 94 of the MD ENC/DEC 62 of the medium drive section 16. The scrambler 91 performs scrambling processing and EDC (Error Detection Code) encoding processing for the inputted image data and stores resulting data into the memory 61 over a bus 95. The image data stored in the memory 61 is transferred over the bus 95 to an error correction code (ECC) section 92, by which processing for adding error correction codes is executed. Then, the image data to which the error correction codes are added is transferred again over the bus 95 to an RLL (1, 7) conversion section 96, by which it is RLL modulated. Then, resulting data is supplied from the RLL (1, 7) conversion section 96 to a magnetic head 71 of the mechanism deck section 17 through a head driver 97. Meanwhile, the RLL (1, 7) conversion section 96 outputs a laser strobe modulation clock signal to a laser automatic power control (APC) driver 98. The laser APC driver 98 controls an optical pickup section 73 in synchronism with the laser strobe modulation clock signal from the RLL (1, 7) conversion section 96 to irradiate a laser beam upon a disk 72.

The optical pickup section 73 outputs a signal corresponding to reflected light from the disk 72 to the RF amplifier 63, by which the signal is amplified. The amplified signal is quantized by the RF ADC 64. The gain of the quantized signal from the RF ADC 64 is controlled by an AGC section 99, and a resulting signal is outputted to an equalizer 100. The equalizer 100 performs equalization processing for the signal inputted thereto and outputs a resulting signal to a Viterbi decoder 101. Further, the equalizer 100 produces a clock signal by means of a PLL (Phase Locked Loop) built therein and outputs the clock signal to a constant linear velocity (CLV) processor 115.

The Viterbi decoder 101 performs Viterbi decoding processing for the data inputted thereto and outputs a resulting signal to an RLL (1, 7) demodulation section 102. The demodulated signal from the RLL (1, 7) demodulation section 102 is sent to and stored into the memory 61 over the bus 95. The demodulated signal stored in the memory 61 is sent to the ECC section 92, by which error correction processing is performed for the demodulated signal. Further, the error corrected demodulated signal is descrambled by a descrambler 93. The descrambled demodulated signal from the descrambler 93 is EDC decoded and outputted to the video signal processing section 15 in synchronism with the clock signal generated by the transfer clock generation section 94.

Now, the digital servo section 65 is described. A signal obtained by photoelectric conversion by the optical pickup section 73 of the mechanism deck section 17 is outputted to the RF amplifier 63 and also to a matrix amplifier 111. The matrix amplifier 111 produces a servo error signal from the signal inputted thereto and outputs the servo error signal to a digital servo signal processor (DSSP) 116. Further, the matrix amplifier 111 extracts a wobble signal from the signal inputted thereto and outputs the wobble signal to an ADIP BPF (Address in Pre-groove on Recordable Disk Band Pass Filter) 112.

The DSSP 116 performs phase compensation for the servo error signal inputted thereto to set a gain target value and supplies a signal of the gain target value thus set to an actuator of the optical pickup section 73 and a sled motor 74 through a driver 117.

Meanwhile, from the wobble signal outputted from the matrix amplifier 111, a predetermined frequency component is extracted by the ADIP BPF 112. The frequency component thus extracted is supplied to an A/B track discrimination section 113, an ADIP decoder 114 and the CLV processor 115. The A/B track discrimination section 113 discriminates, based on the wobble signal inputted thereto, which one of an A track and a B track shown in FIG. 1C a spot for recording or reproduction is positioned, and outputs a result of the discrimination to the microcontroller 66. The ADIP decoder 114 performs ADIP decoding of the signal inputted thereto to detect an address and outputs the address to the microcontroller 66.

The microcontroller 66 detects the position of the spot for recording or reproduction based on the signals inputted thereto from the A/B track discrimination section 113 and the ADIP decoder 114. The microcontroller 66 controls the CLV processor 115 and the DSSP 116 based on the position of the spot to control the spot for recording or reproduction to move to a predetermined address.

The CLV processor 115 controls a spindle motor 75 through the DSSP 116 and the driver 117 based on an output of the ADIP BPF 112, an integrated value of a phase error of the clock signal generated by a PLL built in the equalizer 100 and a control signal from the microcontroller 66.

The mechanism deck section 17 includes the magnetic head 71, optical pickup section 73, sled motor 74, and spindle motor 75. Rotation of the spindle motor 75, that is, rotation of the disk 72 which is rotated by the spindle motor 75, is controlled in accordance with a control signal supplied from the driver 117 of the digital servo section 65. The optical pickup section 73 is moved to a predetermined radial position of the disk 72 by the sled motor 74, and irradiates a laser beam to a predetermined track of the rotating disk 72 and reads a signal from the light reflected from the disk 72. The magnetic head 71 applies a magnetic field to the disk 72 based on a signal from the head driver 97 and cooperates with the laser beam irradiated by the optical pickup section 73 to record a signal onto the disk 72 in response to the clock signal from the laser APC driver 98.

Operation of the digital video camera when it picks up an image of an imaging object and records data of the image is described with reference to a flow chart of FIG. 4.

If a user operates the inputting apparatus 25 to output a recording starting instruction to the microcontroller 48, then the processing is started. In step S1, light from the imaging object is condensed by the lens 11 and adjusted in amount thereof by the diaphragm 12, whereafter it enters the CCD unit 31 of the camera block 14, by which it is converted from an optical signal into an electric signal. The electric signal obtained by the photoelectric conversion is supplied to the AGC section 32, by which the gain thereof is controlled. The signal of the adjusted gain is inputted to the video ADC 33, by which it is converted from an analog signal into a digital signal. The resulting digital signal is outputted as image data to the video signal processing section 15.

The image data inputted from the camera block 14 to the video signal processing section 15 is inputted to the system control section 42, by which it is stored into the memory 41 once. The motion prediction section 43 and the MPEG video processor 44 suitably read out the image data stored in the memory 41, calculate motion vectors of the image and then perform hand-shaking correction processing based on the thus calculated motion vectors. Details of the correction processing are hereinafter described with reference to a flow chart of FIG. 7.

In step S2, the image data obtained by the hand-shaking correction processing is subject to compression rate control processing by the video signal processing section 15 and the camera block 14 and is then supplied to the MD ENC/DEC 62 of the medium drive section 16. The compression rate control processing is hereinafter described with reference to a flow chart of FIG. 8.

In step S3, the image data supplied to the MD ENC/DEC 62 of the medium drive section 16 is inputted in synchronism with a clock signal generated by the transfer clock generation section 94 to the scrambler 91, by which scrambling processing and EDC encoding processing are performed for the image data. Resulting data of the scrambler 91 is stored into the memory 61 over the bus 95. The image data stored in the memory 61 is transferred over the bus 95 to the ECC section 92, by which processing of adding error correction codes is executed. Then, the image data having the error correction codes added thereto is transferred over the bus 95 again to the RLL (1, 7) conversion section 96, by which RLL modulation is performed for the image data. The RLL modulated image data is supplied through the head driver 97 to the magnetic head 71 of the mechanism deck section 17. Simultaneously, the RLL (1, 7) conversion section 96 outputs a laser strobe modulation clock signal to the laser APC driver 98. The laser APC driver 98 controls the optical pickup section 73 based on the laser strobe modulation clock signal so that a laser beam is irradiated upon the disk 72.

The magnetic head 71 applies a magnetic field to the disk 72 based on the signal outputted from the head driver 97 to the magnetic head 11, and the optical pickup section 73 irradiates a laser beam upon the disk 72 in response to the clock signal outputted from the laser APC driver 98 to the optical pickup section 73. The magnetic head 71 and the optical pickup section 73 thus cooperate with each other to record the image data onto the disk 72.

Figure 5:
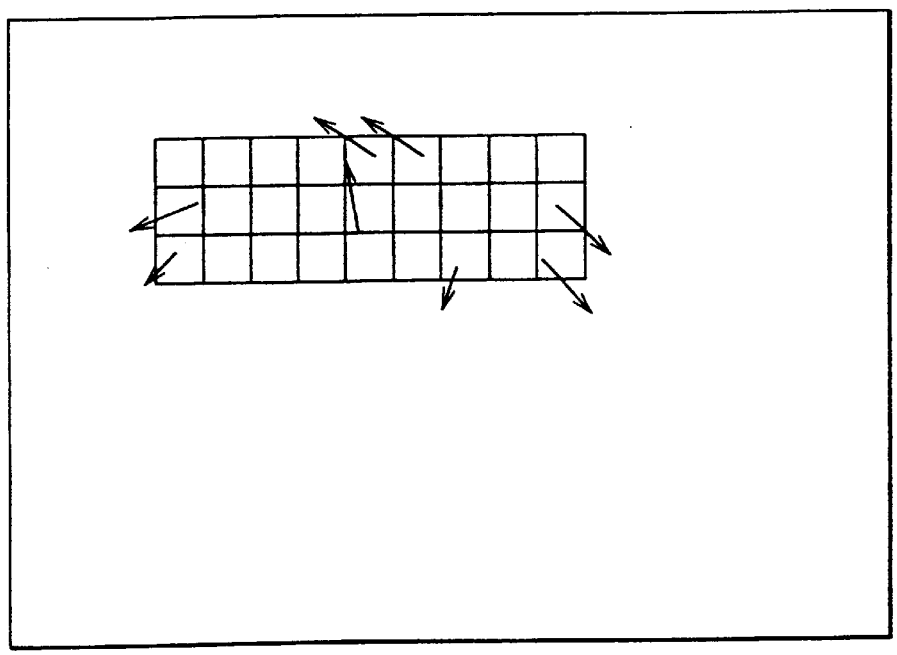
FIG. 5 is a diagrammatic view illustrating motion vectors of a normal frame.

Now, the hand-shaking correction processing is described with reference to FIGS. 5 and 6. Motion vectors on a normal screen (frame) (motion vectors corresponding to motion of an imaging object) are directed to various directions corresponding to motions of individual macro blocks (in FIG. 5, each small rectangle represents a macro block) as seen from FIG. 5 (in FIG. 5, each arrow mark represents a motion vector).

Figure 6:
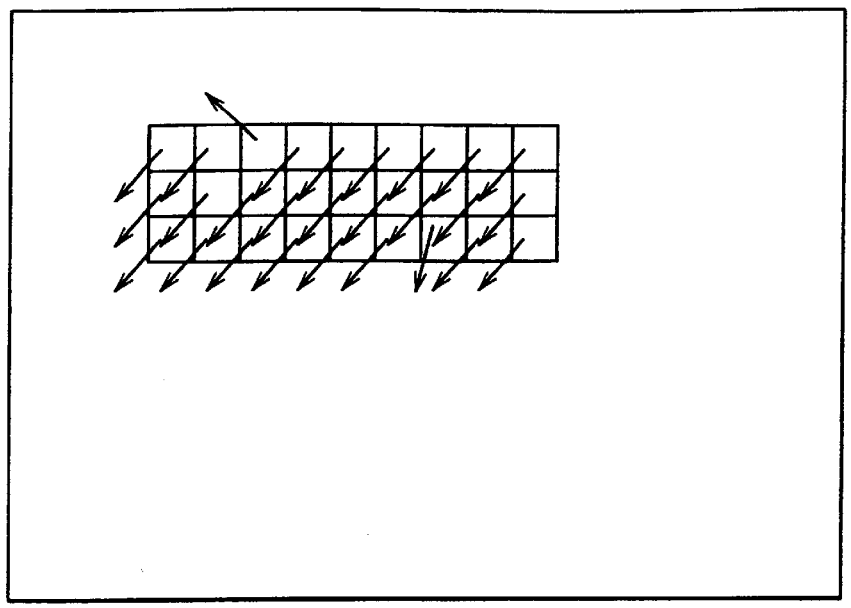
FIG. 6 is a diagrammatic view illustrating motion vectors of a frame upon hand-shaking.

On the other hand, if the digital video camera itself is moved upon picking up by an inadvertent movement of a hand (hand-shaking) of the user holding the same, then motion vectors of almost all of the macro blocks on the frame are directed to the substantially same direction as seen from FIG. 6. Therefore, when the rate of motion vectors which are directed to the substantially same direction is higher than a predetermined threshold level, it can be determined that hand-shaking (inadvertent movement of the digital video camera by movement of the hand) has occurred.

Details of the hand-shaking correction processing are described below with reference to a flow chart of FIG. 7.

Image data from the camera block 14 is inputted to the video signal processing section 15 and then stored into the memory 41 once through the system control section 42. Thereafter, in step S11, the system control section 42 reads out the image data for two screens stored once in the memory 41 and supplies the image data to the motion prediction section 43. Based on the image data for two screens, the motion prediction section 43 calculates motion vectors suitably using the memory 45. In order to determine such motion vectors, a block matching method, a gradient method and so forth are available. Further, motion vectors may be determined not from image data for two screens but from image data for three or more screens.

In step S12, the system control section 42 discriminates whether or not more than 80% of the calculated motion vectors are directed to the substantially same direction. For example, where the image exhibits such motion vectors as seen in FIG. 5, the system control section 42 discriminates that more than 80% of the motion vectors are not directed to the same direction. In other words, it is discriminated that no hand-shaking has occurred. Consequently, the inputted image data is outputted as it is to the following stage, and the original processing is performed.

On the other hand, where the image exhibits such motion vectors as seen in FIG. 6, the system control section 42 discriminates in step S12 that more than 80% of the motion vectors are directed to the same direction (that hand-shaking has occurred), and then performs, in step S13, motion compensation for all pixels by amounts corresponding to the motion vectors detected as caused by the hand-shaking and outputs resulting data. Thereafter, the original processing is performed.

It is to be noted that, while it is described in the foregoing description that it is detected that hand-shaking has occurred when more than 80% of detected motion vectors are directed to the same direction, the rate as the threshold level may be raised to perform hand-shaking correction processing with a higher degree of accuracy. On the contrary, the rate may be lowered to make hand-shaking correction processing rougher so that higher speed processing may be performed.

Figure 4:
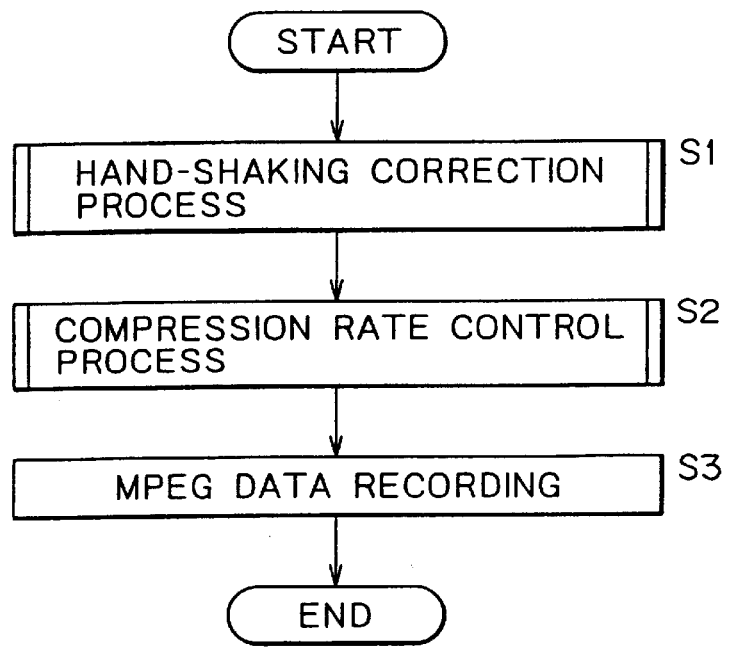
FIG. 4 is a flow chart illustrating recording operation of image data of the digital video camera shown in FIG. 2.

Now, details of the compression rate control processing in step S2 of FIG. 4 are described with reference to a flow chart of FIG. 8.

After hand-shaking correction processing is performed for image data, the system control section 42 controls the MPEG video processor 44 in step S21 to encode (compress) the image data in accordance with the MPEG method. In the MPEG compression method, the image data is compressed so that the picture quality deterioration between the image data and data obtained by decoding of compressed data obtained by the compression processing of the image data may be lower than a predetermined value. In step S22, the system control section 42 discriminates whether or not the amount of the compressed image data is equal to or smaller than a target data amount. If the system control section 42 discriminates that the image data is compressed to the target data amount, then the original processing is performed.

If the compressed image data is not compressed to the target data amount, then the system control section 42 controls the microcontroller 35 of the camera block 14 in step S23 to decrease the depth of field. In particular, if the microcontroller 35 controls so that the diaphragm 12 increases its aperture and the shutter speed is increased, then the depth of field can be decreased without varying the exposure value (EV). Consequently, for example, when it is tried to pick up an image of a person in front of a fountain, if the shutter speed is increased and the aperture ratio of the diaphragm 12 is increased, then if the digital video camera is in a condition focused on the person, then the fountain on the background is in a defocused condition from the image. Therefore, the information amount of the image portion of a splash of water which exhibits random and high speed motion and has high frequency components decreases to increase the redundancy of the image data, by which the information amount of the image data before compression can be reduced. It is to be noted that the shutter speed is adjusted by controlling the exposure time of the CCD unit 31 with the timing signal generated by the timing generation section 34. Although detailed description is omitted here, since image data obtained by picking up of an image by the CCD unit 31 is varied, preferably the hand-shaking correction processing in step S1 of FIG. 4 is performed again. Therefore, upon variation of optical conditions in FIG. 8, the hand-shaking correction processing is performed normally.

In step S24, the system control section 42 discriminates through the microcontroller 35 of the camera block 14 whether or not the shutter speed or the diaphragm has reached its limit (whether or not the EV value varies if the shutter speed or the diaphragm is varied any more). If the shutter speed or the diaphragm has not reached its limit, then the system control section 42 returns its processing to step S22 so that the processing beginning with step S22 is repeated thereafter.

If the shutter speed or the diaphragm has reached its limit, then the system control section 42 controls the microcontroller 35 of the camera block 14 in step S25 to lower the shutter speed.

If the shutter speed is lowered, then, for example, when a fountain is being imaged, image data of a splash of water which exhibits high speed and random motion is put into a defocused condition on the image, and the data amount of image components (high frequency components) of fine particles of a splash of water decreases and the redundancy of the image data increases. Consequently, the information amount of image data before compression decreases. In this instance, since the depth of field becomes fixed and the shutter speed is decreases as the diaphragm is fixed, the exposure value increases. At this time, the microcontroller 35 may control the charge amount of the CCD unit 31 so that the charge amount may not become excessively great.

In step S26, the system control section 42 discriminates whether or not the shutter speed is at its limit (at its lower limit). If the shutter speed is not at its limit, then the system control section 42 returns its processing to step S22 so that the processing beginning with step S22 is repeated thereafter.

If the shutter speed cannot be decreased any more, the system control section 42 controls the microcontroller 35 of the camera block 14 in step S27 so that the lens 11 may be moved by the motor 13 so as to enter a defocused condition.

By putting the digital video camera into a defocused condition, high frequency components of the entire image are removed thereby to increase the redundancy of the image data, and as a result, the information amount of the image data decreases.

In step S28, the system control section 42 discriminates whether or not the defocused condition set in advance has reached its limit. If the defocused condition has not reached its limit, then the system control section 42 returns its processing to step S22 so that the processing beginning with step S22 may be repeated thereafter.

On the other hand, if the defocused condition has reached its limit, then the system control section 42 controls the MPEG video processor 44 in step S29 to vary the quantization coefficient for compression so that the amount of compressed image data may decrease. Thereafter, the processing of the system control section 42 returns to step S21 so that the processing beginning with step S21 is repeated thereafter. It is to be noted that, while, in the processing illustrated in FIG. 8, the optical conditions are controlled as the series of processes, such processes as "to decrease the depth of field", "to decrease the shutter speed" and "to defocus" may otherwise be performed parallelly and independently of each other so that optical conditions may be selected finally.

It is to be noted that, in the foregoing description, the MPEG includes the MPEG1, MPEG2 and MPEG4. However, any compression technique may be used only if it utilizes the redundancy of data to compress the data.

As described above, since hand-shaking correction processing is executed using motion vectors which are used for MPEG compression of a digital video camera, a sensor for hand-shaking correction is not required, and this allows reduction in size and cost. Further, since an optical condition upon image pickup such as the exposure amount (shutter speed or diaphragm) or the focus is controlled in response to a data amount of image data obtained by MPEG compression to decrease the information amount of image data before compression, the data amount of image data can be optimized.

Figure 7:
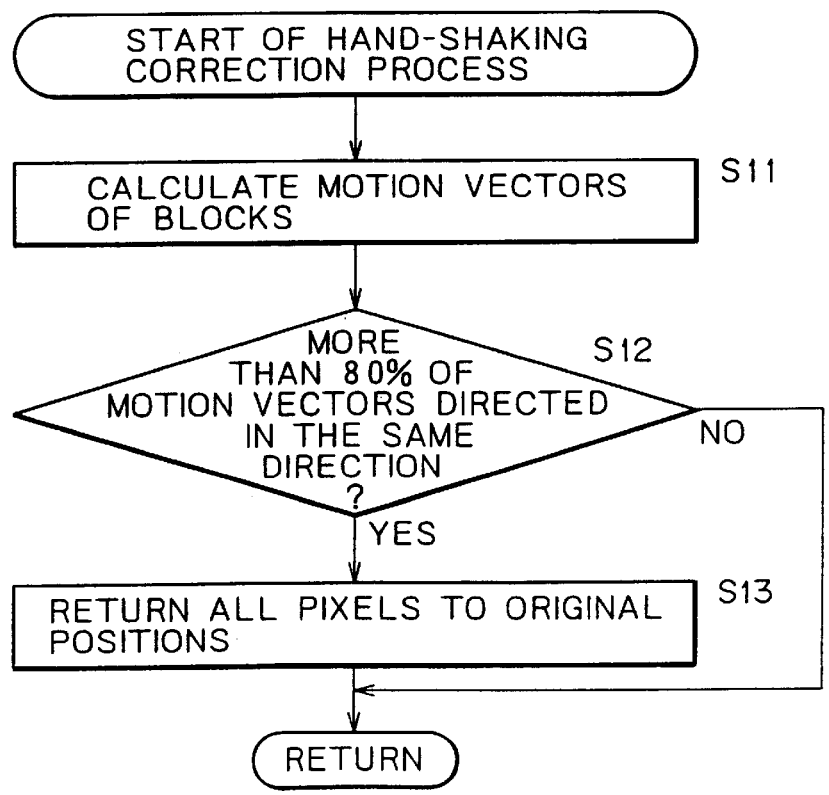
FIG. 7 is a flow chart illustrating a detailed hand-shaking correction process of the digital video camera shown in FIG. 2.
Figure 8:
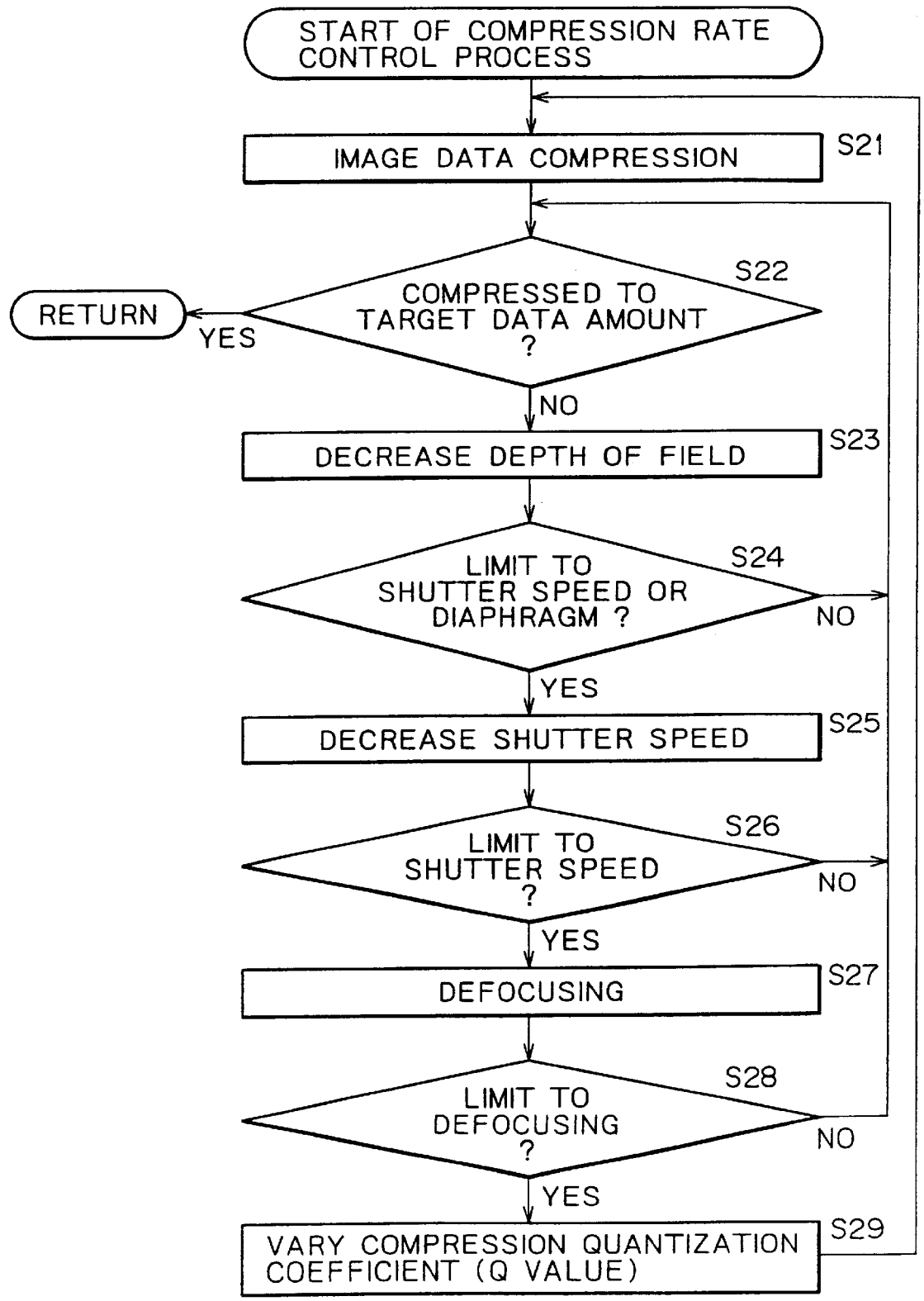
FIG. 8 is a flow chart illustrating a detailed process of compression rate control of the digital video camera shown in FIG. 2.

Further, the series of processes illustrated in FIGS. 4, 7 and 8 may be performed by hardware or by software. Where the series of processes is performed by software, a program which constructs the software is installed into a computer incorporated in a transmission apparatus or a reception apparatus as hardware for exclusive use, a computer for universal use or the like.

A recording medium on which the program for execution of the series of processes described above is recorded and which is used to install the program into a computer so that the program may be executed by the computer is described.

In particular, the program for executing the processes described above can be recorded in advance on a hard disk or a semiconductor memory as a recording medium built in a computer. Alternatively, the program may be temporarily or permanently stored (recorded) on such a recording medium as a floppy disk, a CD-ROM (Compact Disc Read Only Memory), an MO (Magneto-optical) disk, a DVD (Digital Versatile Disc), a magnetic disk or a semiconductor memory.

It is to be noted that the program may be installed into a computer from such a recording medium as described above, or alternatively may be transferred by radio to a computer from a down load site through an artificial satellite for digital satellite broadcasting, or may be transferred by wire to a computer over a network such as a LAN (Local Area Network) or the Internet and then installed into a built-in hard disk by the computer.

Further, in the present application, the steps which describe the program for executing the various processes need not necessarily be processed in a time series in the order appearing on the flow chart, and include processes which are executed parallelly or individually (for example, parallel processing or processing by an object).

Figure 9:
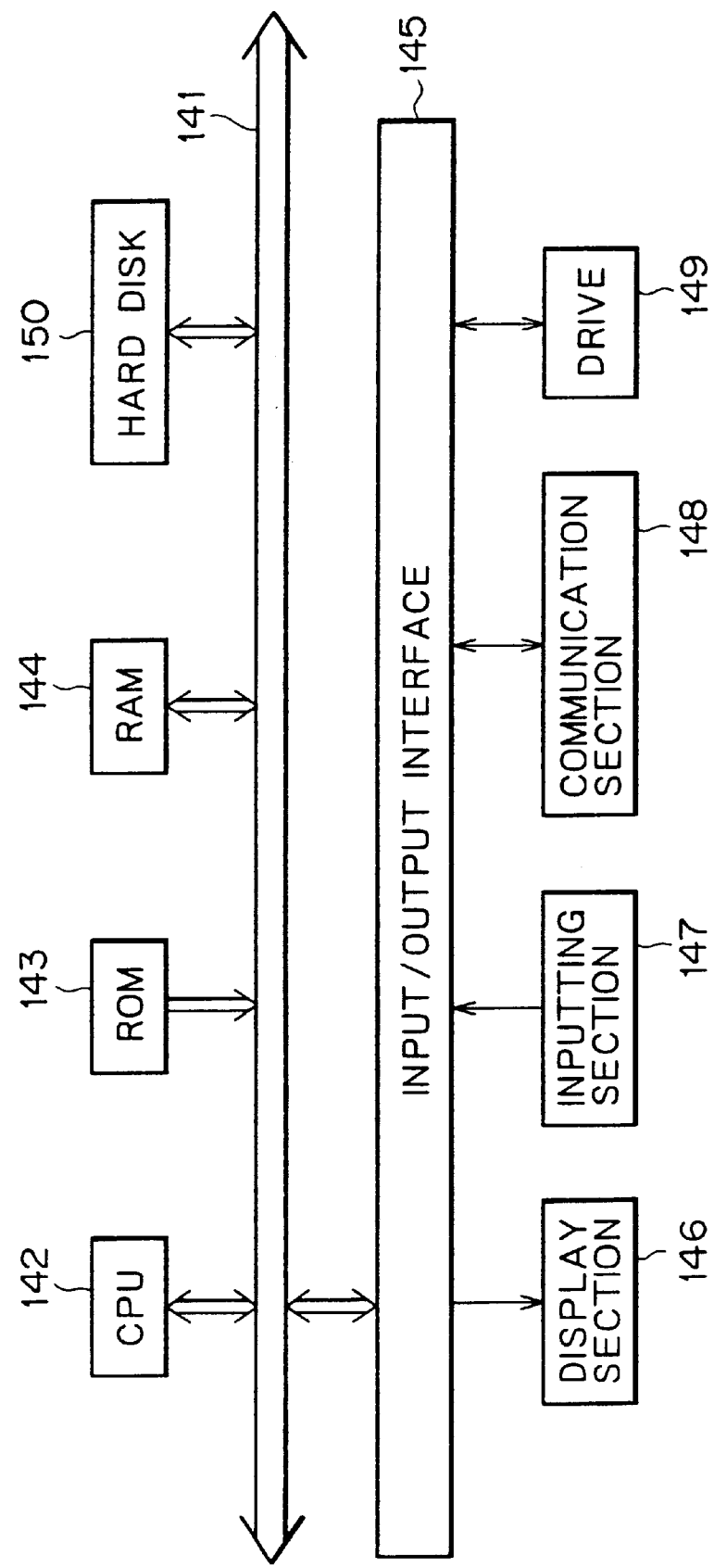
FIG. 9 is a block diagram of a computer which can execute the processes of FIGS. 4, 7 and 8.

FIG. 9 shows an example of an architecture of such a computer as described above.

Referring to FIG. 9, the computer shown has a CPU 142 built therein. An input/output interface 145 is connected to the CPU 142 over a bus 141. If a user operates an inputting section 147 which is formed from a keyboard, a mouse or the like to input an instruction to the CPU 142 through the input/output interface 145, then the CPU 142 executes the program stored in a ROM (Read Only Memory) 143, which corresponds to the semiconductor memory mentioned above, in response to the instruction. Or, the CPU 142 loads into a RAM 144 and executes a program stored on a hard disk 150, a program transferred from such a satellite or a network as mentioned above and received by a communication section 148 and then installed on the hard disk 150 or a program read out from a floppy disk, a CD-ROM, an MO disk, a DVD or a magnetic disk loaded on a drive 149 and installed on the hard disk 150. Then, the CPU 142 outputs, when necessary, a result of the processing, for example, to a display unit 146, which is formed from an LCD (Liquid Crystal Display) unit or the like, through the input/output interface 145.

While a preferred embodiment of the present invention has been described using specific terms, such description is for illustrative purposes only, and it is to be understood that changes and variations may be made without departing from the spirit or scope of the following claims.

What is claimed is:

1. An image processing apparatus which picks up and converts an image of an imaging object into image data and compresses the image data, comprising:

image pickup means for picking up an image of an imaging object and converting the image into image data;

compression means for compressing the image data and outputting the compressed data;

detection means for detecting a data amount of the compressed data; and control means for controlling an optical condition for the image picked up by said image pickup means in response to the data amount of the compressed data detected by said detection means;

wherein said image pickup means picks up an image of an imaging object based on the optical condition controlled by said control means and converts the image into image data, and said compression means compresses the image data and outputs the compressed data.

2. An image processing apparatus according to claim 1, further comprising recording means for recording the compressed data obtained by the compression of said compression means onto a recording medium.

3. An image processing apparatus according to claim 1, wherein said compression means compresses the image data so that the picture quality deterioration between the image data and decoded data obtained by decoding the compressed data may be lower than a predetermined value.

4. An image processing apparatus according to claim 1, wherein said control means controls the optical condition so that the depth of field upon picking up by said image pickup means may be decreased in response to the data amount of the compressed data.

5. An image processing apparatus according to claim 4, wherein said control means controls the diaphragm upon picking up by said image pickup means in response to the data amount of the compressed data.

6. An image processing apparatus according to claim 5, wherein said control means controls the aperture ratio of the diaphragm upon picking up by said image pickup means so as to have a high value when the data amount of the compressed data is greater than a predetermined amount.

7. An image processing apparatus according to claim 4, wherein said control means controls the optical condition so that the exposure value upon picking up by said image pickup means may be substantially fixed.

8. An image processing apparatus according to claim 7, wherein said control means controls the shutter speed upon picking up by said image pickup means.

9. An image processing apparatus according to claim 8, wherein said control means controls the shutter speed so that the shutter speed upon picking up by said image pickup means may be high when the data amount of the compressed data is greater than a predetermined data amount.

10. An image processing apparatus according to claim 1, wherein said control means controls focusing upon picking up by said image pickup means in response to the data amount of the compressed data.

11. An image processing apparatus according to claim 10, wherein said control means controls focusing upon picking up by said image pickup means to defocus the image data when the data amount of the compressed data is greater than a predetermined value.

12. An image processing apparatus according to claim 1, wherein said compression means compresses the image data in accordance with the MPEG method.

13. An image processing apparatus which picks up and converts an image of an imaging object into image data and compresses the image data, comprising:

image pickup means for picking up an image of an imaging object and converting the image into image data;

storage means for storing the image data;

calculation means for calculating motion vectors of the image data stored in said storage means;

hand-shaking detection means for detecting hand-shaking when a user picks up an image of the imaging object making use of the motion vectors;

correction means for correcting the image data against the hand-shaking in response to a result of the detection of said hand-shaking detection means;

compression means for compressing the image data corrected against the hand-shaking making use of the motion vectors and outputting the compressed data;

data amount detection means for detecting a data amount of the compressed data; and control means for controlling an optical condition for the image picked up by said image pickup means in response to the data amount of the compressed data detected by said data amount detection means;

wherein said image pickup means picks up an image of an imaging object based on the optical condition controlled by said control means and converts the image into image data, and said compression means compresses the image data and outputs the compressed data.

14. An image processing method for picking up and converting an image of an imaging object into image data and compressing the image data, comprising the steps of:

picking up an image of an imaging object and converting the image into image data;

compressing the image data and outputting the compressed data;

detecting a data amount of the compressed data; and controlling an optical condition for the picked up image in response to the data amount of the compressed data;

wherein said step of picking up an image includes picking up an image of an imaging object based on the optical condition controlled in said controlling step and converting the image into image data, and said step of compressing includes compressing the image data and outputting the compressed data.

15. An image processing method for picking up and converting an image of an imaging object into image data and compressing the image data, comprising the steps of:

picking up an image of an imaging object and converting the image into image data;

storing the image data;

calculating motion vectors of the stored image data;

detecting hand-shaking when a user picks up an image of the imaging object making use of the motion vectors;

correcting the image data against the hand-shaking in response to a result of the detection;

compressing the image data corrected against the hand-shaking making use of the motion vectors and outputting the compressed data;

detecting a data amount of the compressed data; and controlling an optical condition for the picked up image in response to the detected data amount of the compressed data;

wherein said step of picking up an image includes picking up an image of an imaging object based on the optical condition controlled in said controlling step and converting the image into image data, and said step of compressing includes compressing the image data and outputting the compressed data.

16. A recording medium having stored therein a computer-controllable program for picking up and converting an image of an imaging object into image data and compressing the image data, the program having the steps of:

picking up an image of an imaging object and converting the image into image data;

compressing the image data and outputting the compressed data;

detecting a data amount of the compressed data; and controlling an optical condition for the picked up image in response to the data amount of the compressed data;

wherein said step of picking up an image includes picking up an image of an imaging object based on the optical condition controlled in said controlling step and converting the image into image data, and said step of compressing includes compressing the image data and outputting the compressed data.

17. A recording medium having stored therein a computer-controllable program for picking up and converting an image of an imaging object into image data and compressing the image data, the program having the steps of:

picking up an image of an imaging object and converting the image into image data;

storing the image data;

calculating motion vectors of the stored image data;

detecting hand-shaking when a user picks up an image of the imaging object making use of the motion vectors;

correcting the image data against the hand-shaking in response to a result of the detection;

compressing the image data corrected against the hand-shaking making use of the motion vectors and outputting the compressed data;

detecting a data amount of the compressed data; and controlling an optical condition for the picked up image in response to the detected data amount of the compressed data;

wherein said step of picking up an image includes picking up an image of an imaging object based on the optical condition controlled in said controlling step and converting the image into image data, and said step of compressing includes compressing the image data and outputting the compressed data.

* * * * *